July 2, 1940.    C. CLAR ET AL    2,206,391
PRODUCTION OF LUBRICATING OILS
Filed Sept. 24, 1937
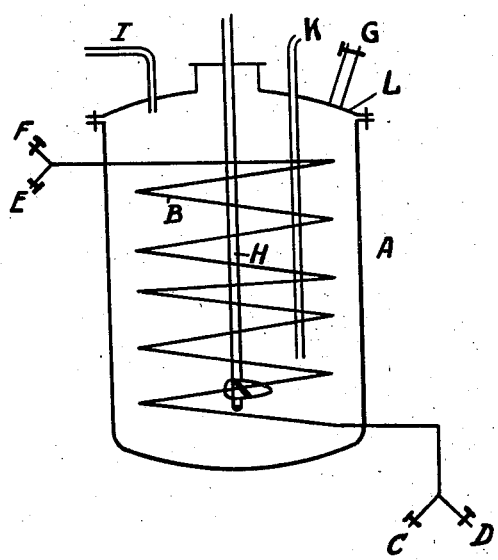

Patented July 2, 1940

2,206,391

UNITED STATES PATENT OFFICE 2,206,391

PRODUCTION OF LUBRICATING OILS

Carl Clar, Oberhausen-Holten, and Herbert Goethel, Duisburg-Hamborn, Germany, assignors to Ruhrchemie Aktiengesellschaft, Oberhausen-Holten, Germany Application September 24, 1937, Serial No. 165,566
In Germany October 1, 1936

4 Claims. (Cl. 196—78)

Our invention relates to lubricating oils and more particularly to an improved method of producing same.

It is an object of our invention to produce lubricating oils by polymerizing olefines by means of a polymerizing catalyst.

It is another object of our invention to artificially produce lubricating oils of a predetermined viscosity.

It is a further object of our invention to improve the methods of producing lubricating oils disclosed in the copending applications for U. S. Letters Patents, Serial No. 115,950 filed December 15, 1936, by Geiser and Goethel and Serial No. 115,951, filed December 15, 1936, by Heinrich Tramm.

It is known to produce lubricating oils by polymerizing liquid cracking products with the aid of polymerizing catalysts or condensing agents such as metal halides, for instance aluminium chloride. Oils of a higher or lower viscosity are obtained thereby in dependency on the kind of the starting materials and on the reaction conditions. It is further known that the physical properties of the lubricating oil obtained depend on the specific starting materials used for the production of the cracking benzine which is treated to condense or polymerize to lubricating oils. It has been suggested for instance, in order to obtain lubricating oils of particularly low solidifying points, to start the production of the cracking benzine from a hydrocarbon mixture consisting of hard and soft paraffins.

It is known that the viscosity of lubricating oils produced by treating olefines with a polymerizing catalyst, such as a metal halide, may be influenced by the quantity of the polymerizing catalyst employed, the temperature prevailing during the polymerization and the duration of the polymerization.

If different olefines or mixtures of olefines or, for instance, different cracking benzines are subjected to polymerization, different absolute values of the three factors must of course be chosen.

We have furthermore found that the polymerization of the cracking products to lubricating oils may be carried through within substantially shorter periods of time, if in the first of several subsequent conversion treatments of the cracking benzine a quantity of polymerization catalyst, preferably aluminium chloride, is used, which is about 3 to 6 times as large as the hitherto used quantity and thus ranges between about 3 and 6 per cent aluminium chloride, calculated on the hydrocarbon mixture treated. If the first batch of cracking benzine to be converted is treated for instance with about 5% aluminium chloride instead of only 1%, the polymerization of the cracking products to lubricating oils will be complete already after about 12 hours, if within the whole time of polymerization the polymerization temperature is caused to gradually rise from about 20° C. to about 60–80° C. The contact layer, which comprises the aluminium chloride sludge formed, after having been separated from the upper layer, which latter contains the polymerized products, and after having been revived by the addition of a small quantity, amounting to about 0.5–2%, calculated on the quantity of the cracking benzine used, of fresh polymerization catalyst serves for converting a new batch of cracking benzines. Again the polymerization of the cracking benzines to lubricating oils will be complete within the course of 12 hours, if the temperature is raised in the same manner from about 20 to 60–80° C. The contact layer obtained in the conversion of the first batch may be frequently reused in this manner, after having been revived each time.

We obtain particularly favorable results when using a cracking benzine produced from so-called primary synthetic benzine, i. e., a benzine as obtained by catalytic hydrogenation of carbon monoxide with hydrogen at low pressure, such as atmospheric or reduced pressure or any pressure not substantially above 2 atmospheres, according to the well known method of Fischer and Tropsch. We cracked for instance synthetic paraffinic hydrocarbons, boiling above 140° C., such as obtained according to the method of Fischer and Tropsch, so as to form a cracking benzine with a specific weight, at 20° C., of 0.700 to 0.718, 25–50% of which boiled below 100° C., while about 90–100% distilled over at temperatures up to 170° C. With this cracking benzine the conversion could subsequently be carried out up to 60 times, the old contact layer which was not yet exhausted, being always reused. By the frequent re-use of the contact layer or sludge the consumption of the aluminium chloride is hardly increased in spite of the increase in the quantity of this catalyst employed at the start. By the re-use of the reactivated contact layer the further advantage is obtained that each conversion of cracking products is carried out with a polymerizing catalyst of the same activity, so that a polymerization product of uniform properties may be obtained in continuous technical operation.

We have further found that the viscosity of the lubricating oils formed may be influenced by that quantity of polymerization catalyst which is added afresh to the contact layer, which comprises the aluminium chloride sludge. If for instance in the manner of operation described above 0.5% fresh aluminium chloride, instead of 1.3%, are added to one of the subsequent batches of cracking benzine and the polymerization is conducted with the same increase of temperature and during the same time of polymerization, the yield of lubricating oil does not drop, but an oil is obtained, the viscosity of which has dropped nearly to one half of the viscosity of the lubricating oil before obtained. The viscosity of the lubricating oil formed may thus be influenced by varying the quantity of fresh polymerizing agent: a smaller quantity of polymerizing catalyst causes a decreased viscosity, while with a larger quantity of polymerizing catalysts lubricating oils of higher viscosity are produced. In the production of lubricating oils of lower viscosity we prefer, under certain circumstances, to raise the temperature during the period of polymerization still higher, for instance from 20 up to 80–100° C. In order to obtain higher viscosities, we found it furthermore advisable to extend the duration of the polymerization up to for instance 16–18 hours, while keeping the other conditions constant.

The drawing accompanying this specification is a flow sheet illustrating in a diagrammatic manner an embodiment of our invention.

Referring to the drawing, A is a reaction vessel, while L is a cover which may be screwed on this vessel to close it. In the vessel A is arranged the coil B which serves for the passage of cooling means as well as heating means. The cooling means enters the coil at C and leaves it at E. The steam, which may be employed as heating means, enters the coil at F, while the condensed steam is withdrawn at D. Shaft H, the inlet I for the benzine to be polymerized, the suction pipe K for the withdrawal of the polymerized hydrocarbons and the tube G for the introduction of the catalyst pass through the cover L. In operation the reaction vessel A is charged with the benzine hydrocarbons and the catalyst, polymerization being carried through by controlling the temperature by means of heating or cooling means passing through coil B. After polymerization is completed and the aluminium chloride sludge has settled down, the polymerized constituents are withdrawn through pipe K by suction. Pipe K may simultaneously be employed as safety tube when the pressure changes.

The invention may be explained further by the following examples, all of which start from cracking benzines produced by cracking such benzines which were obtained by hydrogenating carbon monoxide according to the method of Fischer and Tropsch. Other hydrocarbon mixtures containing olefines, for instance benzines rich in olefines, as recovered by a catalytic dehydrogenation, may, however, be polymerized in the same way, i. e., the viscosity of the lubricants produced may be controlled by the same measures.

In carrying out the present invention, all the details of operation may be utilized which were disclosed in the copending applications Serial Nos. 115,950 and 115,951 mentioned above and more particularly those details which have regard to the reactivation and the frequent re-use of the polymerization catalyst or condensing agent and those having regard to the control of the temperature prevailing in the course of a single polymerization as such, and which may gradually or stepwise be increased, and in relation to the preceding or the subsequent polymerization treatments. Accordingly the temperature may range between about 20 and 120° C.; the period of polymerization for each charge treated at practically the same temperature may range between about 12 and 20 hours.

The first examples show how the viscosity of the oils produced depends on the quantity of the polymerization catalyst and on the temperature prevailing during polymerization. In each of the examples 1–5, five single experiments are compiled which were carried through successively under the same conditions of reaction. The duration of the polymerization amounted to 12 hours in each case. The quantities of polymerization catalysts added before starting each single conversion differed in each case, and the temperatures used differed as well.

The polymerization process was always conducted in the following manner:

Into an autoclave of a capacity of 50 litres, which is provided with an agitator, there are introduced 15,000 grams dried cracking benzine, a certain quantity of the aluminium chloride double-compound as obtained in the preceding conversions of aluminium chloride with portions of cracking benzine, and a certain quantity of fresh aluminium chloride, as will be specified in each of the following examples. During the whole time of polymerization amounting to 12 hours the content of the vessel is thoroughly stirred, while the temperature is increased in the manner described in the following examples. The increase of the temperature in the course of the period of polymerization differs in each example. After a lapse of 12 hours, during which the polymerization is carried out, the vessel is allowed to cool down to room temperature; thereby the contact layer settles in the form of an oily layer. From this contact layer there is then separated the upper layer which contains the lubricating oil formed and those parts of the benzine which have not been converted into lubricating oil. The separated upper layer is treated with acid and lye and subsequently washed with water, and thereupon dried. From the dried product of reaction the not-converted benzine is distilled off up to 180° C.; this distillate is designated in the following tables as "residual benzine." The remainder of the distillation under ordinary pressure is subjected to a distillation in vacuo at a pressure of 5 mm. mercury column up to 200° C., the lubricating oil remaining over as distillation residue. The distillate passing over during distillation in vacuo is designated in the following tables as "middle oil." The content of the upper layer, which contains the products of reaction, in residual benzine, middle oil and lubricating oil is scheduled in the tables in per cents by weight calculated on the quantity of the starting cracking benzine. In order to characterise the physical qualities of the lubricating oils obtained, the viscosities in degrees Engler (E.) at 50° C. and the densities at 20° C. are mentioned also.

*Example 1*

5 tests were carried through, in each of which 0.5% by weight aluminium chloride, calculated on the quantity of benzine used, were added to the contact oil layer before the beginning of the polymerization. The temperature of polymerization was caused to rise stepwise in the course of each conversion, the polymerization being carried through two hours at 20°, 4 hours at 50° and 6 hours at 70° C. Table 1 shows the detailed data of the experiments and the results.

TABLE 1

| Experiment No. | 1 | 2 | 3 | 4 | 5 |
|---|---|---|---|---|---|
| Charge: | | | | | |
| Quantity of contact oil in grams— | | | | | |
| Before conversion | 7,330 | 8,055 | 9,080 | 8,455 | 8,980 |
| After conversion | 8,055 | 9,080 | 8,455 | 8,980 | 15,150 |
| Benzine employed in grams | 15,000 | 15,000 | 15,000 | 15,000 | 15,000 |
| Addition of fresh AlCl$_3$ in grams | 75 | 75 | 75 | 75 | 75 |
| Products of reaction obtained (upper layer) in grams | 14,350 | 14,050 | 15,700 | 14,550 | 15,150 |
| Content of the upper layer in residual benzine percent | 22.6 | 22.5 | 33.9 | 32 | 32 |
| Middle oil do | 21.4 | 13.2 | 16.0 | 14 | 20 |
| Lubricating oil do | 51 | 56.6 | 54 | 48 | 48 |
| Density of the lubricating oil at 20° C | 0.858 | 0.853 | 0.852 | 0.852 | 0.858 |
| Viscosity of the lubricating oil at 50° C °E | 8.55 | 8.04 | 8.08 | 7.95 | 8.16 |

Example 2

In the 5 experiments next following 1% by weight aluminium chloride, calculated on the quantity of cracking benzine employed, was added before the beginning of the polymerization to the mixture to be treated. Polymerization was carried through two hours at 20°, 4 hours at 50° and 6 hours at 70°. As compared with Example 1, lubricating oils of higher viscosity were obtained by the use of a larger quantity of aluminium chloride, while the duration and the temperatures of polymerization were the same. Table 2 shows the detailed data of the experiments and the results.

TABLE 2

| Experiment No. | 1 | 2 | 3 | 4 | 5 |
|---|---|---|---|---|---|
| Charge: | | | | | |
| Quantity of contact oil in grams— | | | | | |
| Before conversion | 10,150 | 10,500 | 11,100 | 10,800 | 11,180 |
| After conversion | 10,500 | 11,100 | 10,800 | 11,180 | 11,280 |
| Benzine employed in grams | 15,000 | 15,000 | 15,000 | 15,000 | 15,000 |
| Addition of fresh AlCl$_3$ in grams | 150 | 150 | 150 | 150 | 150 |
| Products of reaction obtained (upper layer) in grams | 14,800 | 14,550 | 15,450 | 14,770 | 15,050 |
| Content of the upper layer in residual benzine percent | 42.5 | 47.3 | 36.5 | 35.5 | 32 |
| Middle oil do | 11.0 | 6.4 | 20.0 | 10.1 | 17.2 |
| Lubricating oil do | 44.6 | 40.2 | 43.8 | 44.8 | 50 |
| Density of the lubricating oil at 20° C | 0.851 | 0.851 | 0.852 | 0.853 | 0.852 |
| Viscosity of the lubricating oil at 50° C °E | 12.5 | 12.15 | 14.2 | 12.12 | 12.4 |

Example 3

In Examples 3 and 4 lower temperatures of polymerization were employed, while the duration of the polymerization was the same as in Examples 1 and 2. In both Examples (3 and 4) polymerization was carried through four hours at 20° and eight hours at 50°, while the quantity of added polymerization catalyst differed in the two examples. With an average quantity of polymerization catalyst of 1% by weight, calculated on the starting quantity of cracking benzine, lubricating oils were obtained which showed a viscosity of 50° C. of 15–18° E. Table 3 shows the detailed data of the experiments and results.

TABLE 3

| Experiment No. | 1 | 2 | 3 | 4 | 5 |
|---|---|---|---|---|---|
| Charge: | | | | | |
| Quantity of contact oil in grams— | | | | | |
| Before conversion | 17,820 | 18,350 | 18,950 | 19,150 | 19,380 |
| After conversion | 18,350 | 18,950 | 19,150 | 19,380 | 19,980 |
| Benzine employed in grams | 15,000 | 15,000 | 15,000 | 15,000 | 15,000 |
| Addition of fresh AlCl$_3$ in grams | 150 | 150 | 150 | 150 | 150 |
| Products of reaction obtained (upper layer) in grams | 14,620 | 14,550 | 14,950 | 14,920 | 14,550 |
| Content of the upper layer in residual benzine percent | 41.4 | 42.8 | 33.7 | 39.9 | 33.8 |
| Middle oil do | 10.1 | 8.9 | 14.55 | 7.0 | 6.8 |
| Lubricating oil do | 45.0 | 45.0 | 50.4 | 51.6 | 55.3 |
| Density of the lubricating oil at 20° C | 0.862 | 0.858 | | | |
| Viscosity of the lubricating oil at 50° C °E | 18.0 | 15.0 | 15.4 | 17.5 | 18 |

Example 4

The conditions of operation were the same as in the experiments of Example 3, with the only exception that 1.3% aluminium chloride, instead of 1%, were added to the single charges. By the increased quantity of polymerization catalyst oils with a higher viscosity were obtained, viz. with a viscosity of 20–22° E. at 50° C. Table 4 shows the results.

TABLE 4

| Experiment No. | 1 | 2 | 3 | 4 | 5 |
|---|---|---|---|---|---|
| Charge: | | | | | |
| Quantity of contact oil in grams— | | | | | |
| Before conversion | 13,810 | 15,210 | 14,910 | 15,510 | 15,990 |
| After conversion | 15,210 | 14,910 | 15,510 | 15,990 | 16,890 |
| Benzine employed in grams | 15,000 | 15,000 | 15,000 | 15,000 | 15,000 |
| Addition of fresh AlCl$_3$ in grams | 200 | 200 | 200 | 200 | 200 |
| Products of reaction obtained (upper layer) in grams | 13,800 | 15,500 | 14,600 | 14,720 | 14,300 |
| Content of the upper layer in residual benzine percent | 35.1 | 39.6 | 34 | 37.3 | 41.6 |
| Middle oil do | 7.6 | 10.6 | 11 | 7.4 | 3.8 |
| Lubricating oil do | 47.0 | 52.1 | 51.6 | 53.0 | 49.5 |
| Density of the lubricating oil at 20° C | | | | | |
| Viscosity of the lubricating oil at 50° C °E | 20 | 22 | 24.5 | 20.3 | 21 |

Example 5

Five experiments were carried out again with a 12 hours duration of polymerization, the temperature of polymerization being maintained two hours at 20°, four hours at 50° and the last six hours at 70°. The quantity of aluminium chloride added to each charge amounted to 1.3%. These experiments show that by simultaneously increasing the temperature and the quantity of the polymerization catalyst, the viscosity of the lubricating oils obtained is increased to a higher extent than if only the temperature or only the quantity of polymerization catalyst is increased, so that lubricating oils were obtained with a viscosity of 15–20° E. at 50° C. Table 5 shows the data of experiments and the results.

TABLE 5

| Experiment No | 1 | 2 | 3 | 4 | 5 |
|---|---|---|---|---|---|
| Charge: | | | | | |
| Quantity of contact oil in grams— | | | | | |
| Before conversion | 7,000 | 7,750 | 8,550 | 7,250 | 7,650 |
| After conversion | 7,750 | 8,550 | 7,250 | 7,650 | 8,950 |
| Benzine employed in grams | 15,000 | 15,000 | 15,000 | 15,000 | 15,000 |
| Addition of fresh $AlCl_3$ in grams | 200 | 200 | 200 | 200 | 200 |
| Products of reaction obtained (upper layer) in grams | 14,450 | 14,400 | 16,500 | 14,800 | 13,900 |
| Content of the upper layer in residual benzine percent | 32.0 | 31.1 | 35.0 | 24.6 | 24.0 |
| Middle oil do | 11.2 | 11.0 | 12.3 | 13.4 | 14.6 |
| Lubricating oil do | 52.8 | 53.6 | 62.0 | 59.8 | 54.1 |
| Density of the lubricating oil at 20° C | 0.858 | 0.857 | 0.857 | 0.856 | 0.856 |
| Viscosity of the lubricating oil at 50° C ° E | 20.85 | 18 | 15.8 | 15.5 | 17.3 |

Example 6

The following experiments illustrate the influence of the duration of the polymerization on the viscosity of the lubricating oils obtained. To a contact oil layer recovered in preceding conversions and amounting to 6650 grams there are added 150 grams aluminium chloride and 15,000 grams cracking benzine in an autoclave provided with an agitator. The temperature in the autoclave is maintained at 20° C. for the first four hours and then increased to and maintained eight hours at 50° C. The products of reaction are then allowed to settle and a sample is taken from the upper layer. The sample was distilled to remove the residual benzine and subsequently distilled in vacuo to remove the insufficiently condensed middle oils. There remained over, with a yield of 49%, a lubricating oil showing a viscosity of 16.8° E. at 50° C. The polymerization of the batch was continued another four hours at the same temperature of 50° C., whereupon another sample was taken and examined in the same manner. The product of reaction now proved to contain 49.4% of a lubricating oil, which had a viscosity of 19.7° E. at 50° C. A further extension of the duration of polymerization for four hours caused the content of the reaction product in lubricating oil to rise to 50.4%, and the lubricating oil thus obtained had a viscosity of 20.8° E. The samples taken from the upper layer were treated in the manner described above by washing with acid, lye and water and subsequently drying.

The following experiments show the influence of the duration of polymerization and of the quantity of the polymerization catalyst, while the temperature of polymerization remained unchanged, on the viscosity of the lubricating oils obtained. It was found that by an extended duration of the polymerization and an increased quantity of aluminium chloride oils of higher viscosities were obtained, while thinner oils of lower viscosities were obtained, if higher temperatures and shorter periods of polymerization were employed.

Example 7

200 grams fresh aluminium chloride and 15,000 grams cracking benzine were added to a quantity of contact oil amounting to 9,520 grams in an autoclave provided with an agitator. For 60 hours the temperature in the autoclave was maintained at 20° C., while the reaction mixture was vigorously stirred. After the reaction had been completed, an upper layer containing the products of reaction and amounting to 14,650 grams was obtained, while 10,050 grams of contact oil remained in the vessel and were employed for further conversions. The upper layer was treated in the manner described above for the recovery of lubricating oil; we thereby obtained 7280 grams of a lubricating oil of a viscosity of 27.2° E. at 50° C.

Example 8

To 8650 grams contact oil were added, in an autoclave provided with an agitator, 150 grams fresh aluminium chloride and 15,000 grams cracking benzine. After 48 hours, during which the content of the vessel was maintained under stirring at 20° C., an upper layer amounting to 14,200 grams could be withdrawn from the autoclave. The lubricating oil recovered from this layer in a quantity of 7290 grams showed a viscosity of 20.5° E. at 50° C.

Example 9

In the same autoclave 15,000 grams cracking benzine were mixed and treated at 50° C. with 1% by weight fresh aluminium chloride (of 100% $AlCl_3$) and a quantity of 11,250 grams contact oil; after the lapse of four hours the polymerization was terminated. An upper layer amounting to 15,290 grams was obtained, from which 7040 grams lubricating oils having a viscosity of 15.5° E. at 50° C. could be recovered.

The term "gradually raising the temperature," as used in the specification and the claims, is intended to include also a stepwise increase.

Various changes may be made in the details disclosed in the foregoing specification without departing from the invention or sacrificing the advantages thereof.

We claim:

1. In the production of lubricating oil by polymerizing benzine hydrocarbons in a series of successive polymerization operations carried out in the presence of aluminium chloride as polymerization catalyst at a temperature ranging, in dependency on the viscosity desired of the lubricating oil to be produced, between 20 and 120° C., during a period of time ranging in each of said operations, in dependency on the viscosity desired of the lubricating oil to be produced, between 12 and 20 hours, wherein in the first of said operations a portion of said benzine hydrocarbons is treated with 3 to 6 per cent aluminium chloride, while in each of the following operations another portion of said benzine hydrocarbons is treated with the lower layer comprising the aluminium chloride sludge formed in a preceding operation, the step of adding to said lower layer, when acting with it on a fresh portion of said benzine hydrocarbons, a quantity of fresh aluminium chloride amounting to approximately 0.5 per cent, calculated on the benzine treated, for the production of lubricating oil of low viscosity, to approximately 1 per cent for the production of lubricating oil of mean viscosity and to approximately 1.3 per cent for the production of lubricating oil of high viscosity, the temperature being raised in each operation while the polymerization proceeds.

2. The method of claim 1, when applied to the production of lubricating oil from hydrocarbon mixtures containing unsaturated hydrocarbons of the aliphatic series.

3. The method of claim 1, when applied to the production of lubricating oil from synthetic benzine as obtained by hydrogenation of carbon monoxide with hydrogen at an elevated temperature not exceeding about 250° C. and under a pressure substantially not above two atmospheres with the use of a catalyst containing at least one metal of the group constituted by nickel and cobalt.

4. The method of claim 1, when applied to the production of lubricating oil from cracked benzine hydrocarbons.

CARL CLAR.
HERBERT GOETHEL.